(12) United States Patent
Cobb (10) Patent No.: US 7,874,854 B2
(45) Date of Patent: Jan. 25, 2011

(54) COMMUNICATIONS PATCHING DEVICES THAT INCLUDE INTEGRATED ELECTRONIC STATIC DISCHARGE CIRCUITS AND RELATED METHODS

(75) Inventor: Terry Cobb, Plano, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 46 days.

(21) Appl. No.: 12/391,415

(22) Filed: Feb. 24, 2009

(65) Prior Publication Data
US 2010/0216335 A1    Aug. 26, 2010

(51) Int. Cl.
*H01R 13/53* (2006.01)
(52) U.S. Cl. .................................. 439/181; 439/540.1
(58) Field of Classification Search .............. 439/540.1, 439/188, 181
See application file for complete search history.

(56) References Cited

U.S. PATENT DOCUMENTS

| | | | | |
|---|---|---|---|---|
| 5,281,155 | A * | 1/1994 | Comerci et al. ............. | 439/107 |
| 5,674,083 | A * | 10/1997 | Whiteman et al. .......... | 439/181 |
| 5,947,773 | A * | 9/1999 | Karam ....................... | 439/676 |
| 5,995,353 | A | 11/1999 | Cunningham et al. | |
| 6,359,766 | B1 * | 3/2002 | Youngman et al. .......... | 361/119 |
| 6,541,988 | B2 * | 4/2003 | Dangelmayer et al. ...... | 324/754 |
| 6,836,397 | B2 * | 12/2004 | Chen et al. .................. | 361/220 |
| 6,859,351 | B2 | 2/2005 | Byrne et al. | |
| 6,935,879 | B2 | 8/2005 | Whitney et al. | |
| 7,035,072 | B2 * | 4/2006 | Colby ........................ | 361/118 |
| 7,038,898 | B1 * | 5/2006 | Pasqualini ................... | 361/56 |
| 7,422,455 | B2 * | 9/2008 | Eshet ......................... | 439/181 |
| 7,429,178 | B2 * | 9/2008 | Givens et al. ................ | 439/79 |
| 7,431,600 | B2 * | 10/2008 | Kozak et al. ................ | 439/181 |
| 7,481,677 | B1 * | 1/2009 | Yi et al. ..................... | 439/607.01 |
| 7,567,419 | B2 * | 7/2009 | Lu et al. ..................... | 361/220 |
| 7,594,820 | B2 * | 9/2009 | Eshet ......................... | 439/181 |
| 2002/0189086 | A1 | 12/2002 | Yamaguchi et al. | |
| 2008/0102671 | A1 | 5/2008 | Eshet | |

FOREIGN PATENT DOCUMENTS

| | | |
|---|---|---|
| DE | 102007002768 A1 | 7/2008 |
| EP | 1111730 A2 | 12/2000 |
| WO | WO 02/073741 A2 | 9/2002 |

(Continued)

OTHER PUBLICATIONS

International Search Report and Written Opinion for PCT/US2010/023158, dated Apr. 1, 2010.

(Continued)

*Primary Examiner*—Briggitte R Hammond
(74) *Attorney, Agent, or Firm*—Myers Bigel Sibley & Sajovec (57) ABSTRACT

Communications patching devices are provided that include a mounting frame and a first jack that is mounted to the mounting frame. The first jack has a plurality of input terminals, a plurality of output terminals and a printed circuit board that includes a plurality of conductive paths that each electrically connect a respective one of the input terminals to a respective one of the output terminals. The printed circuit board further includes a plurality of electronic static discharge circuits, each of which circuit provides a path for discharging static charges to ground. Related methods and RJ-45 jacks are also provided.

9 Claims, 10 Drawing Sheets

FOREIGN PATENT DOCUMENTS

WO    WO 2008/152584 A2    12/2008

OTHER PUBLICATIONS

Daniel Dove, "Chair's Summary Report," IEEE 802.3 Cable Discharge Adhoc, Sep. 18, 2002.

Leo Chang, "Cable Discharge Event," National Semiconductor Application No. 1511, Jul. 2006.

PulseGuard® Suppressors, Electronics Designers Guide, Littelfuse © PGB1 Series, 2007.

DP83848J PHYTER® Mini LS, Commercial Temperature Single Port 10/100 Ethernet Transceiver, National Semiconductor, May 2008.

Cat6 Protected Patch Cord, Black Box Corp., Item #8280730, Mfr. Part # SP010A-R2 (Admitted prior art).

ESD and RF Mitigation in Handheld Batter Pack Electronics, Texas Instruments, SLUA460—Mar. 2008 (incomplete—p. 2 only).

* cited by examiner

COMMUNICATIONS PATCHING DEVICES THAT INCLUDE INTEGRATED ELECTRONIC STATIC DISCHARGE CIRCUITS AND RELATED METHODS

FIELD OF THE INVENTION

The present invention generally relates to communications jacks and, more particularly, to communications patching devices that include a plurality of communications jacks.

BACKGROUND

Many businesses have dedicated communications systems that enable computers, servers, printers, facsimile machines and the like to communicate with each other, through a private network, and with remote locations via a telecommunications service provider. In, for example, commercial office buildings, the dedicated communications system may be hardwired using communications cables that contain conductive wire. In such hard wired systems, modular wall jacks such as RJ-45 style jacks are mounted in offices throughout the building. Communications cables are run through, for example, the walls and/or ceiling of the building to electrically connect each jack to network equipment (e.g., network routers and servers) that are located in, for example, a computer room. Communications cables from external telecommunication service providers may also terminate within the computer room.

Communications patching systems may be used to connect the communications cables running from the modular wall jacks in offices throughout the building to the network equipment in the computer room. These communications patching systems may facilitate terminating the cables in an organized fashion, and may also simplify the process for later making changes to the connections between communications cables. Typically, a communications patching system includes one or more equipment racks. Network equipment such as, for example, network servers and switches may be mounted on these racks, as may one or more "patch panels." As is known to those of skill in the art, a "patch panel" refers to an interconnect device that includes a plurality of jacks such as, for example, RJ-45 style jacks, on at least one side thereof. Each jack is configured to receive a mating plug of a patch cord (i.e., a communications cable with a modular plug on at least one end thereof). Communications cables may also be terminated into the back end of some or all of the jacks in the patch panel (the communications wires of each cable are typically terminated into individual contacts on the back end of the jack such as, for example, insulation displacement contacts). Thus, each jack of the patch panel may provide a communications paths between a patch cord that is plugged into the jack and a communications cables that is terminated into the reverse side of the jack. The connectivity between the individual wall jacks and the ports on the network equipment can be modified by simply rearranging the connectivity of the patch cords that are plugged into the patch panels.

Figure 1:
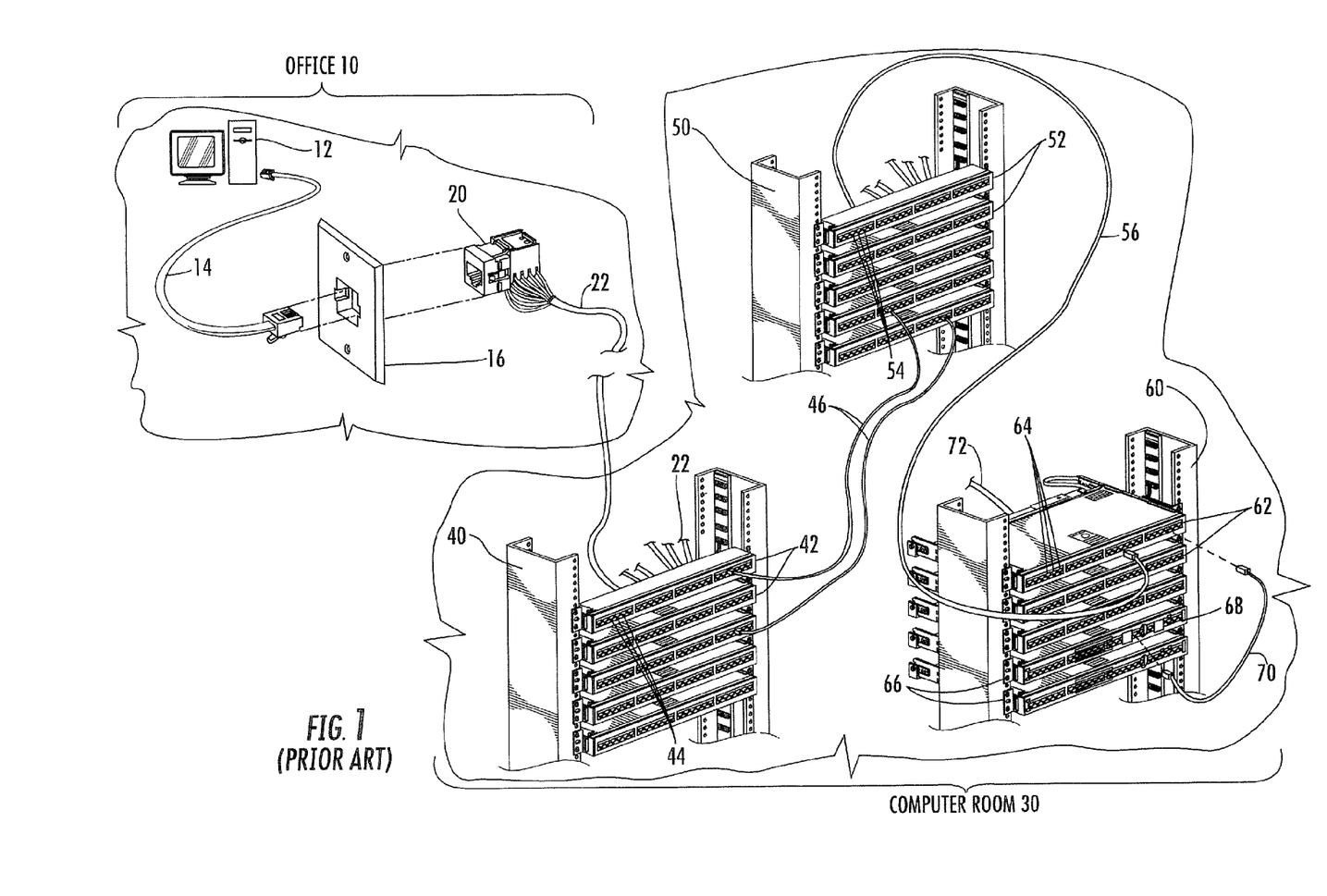
FIG. 1 is a simplified schematic diagram illustrating a conventional communications patching system that is used to connect a computer to network equipment.

FIG. 1 is a simplified example of one way in which a computer 12 in an office 10 of a building may be connected to network equipment 62, 66 located in, for example, a computer room 30 of the building. As shown in FIG. 1, the computer 12 is connected by a patch cord 14 to a modular RJ-45 style wall jack 20 that is mounted in a wall plate 16 in office 10. A communications cable 22 is routed from the back end of the modular wall jack 20 through, for example, the walls and/or ceiling of the building, to the computer room 30. As there will often be hundreds or thousands of wall jacks 20 within an office building, a large number of cables 22 are routed into the computer room 30. As is known to those of skill in the art, in twisted pair communications systems, such as the system depicted in FIG. 1, each of the communications cables, patch cords and jacks, such as cables 22, patch cord 14 and jack 20 of FIG. 2, will typically include eight conductive paths which are arranged as four pairs of conductive paths. Each of these pairs of conductive paths may be used to transmit a differential signal. Thus, the communications channel that is formed by a cascade of jacks, cables and patch cords that connects a first piece of equipment (e.g., computer 12 in FIG. 1) to a second piece of equipment (e.g., network router 66 of FIG. 1) may carry a total of four different communications signals over the four differential pairs of conductive paths.

A first equipment rack 40 is provided within the computer room 30. A plurality of patch panels 42 are mounted on the first equipment rack 40. Each patch panel 42 includes a plurality of jacks 44. In FIG. 1, each jack 44 comprises an RJ-45 style jack that is configured to receive an RJ-45 style plug. As shown in FIG. 1, each communications cable 22 that provides connectivity between the computer room 30 and the various offices 10 in the building is terminated onto the back end of one of the jacks 44 of one of the patch panels 42 on equipment rack 40. A second equipment rack 50 is also provided in the computer room 30. A plurality of patch panels 52 that include jacks 54 are mounted on the second equipment rack 50. A first set of patch cords 46 (only two exemplary patch cords 46 are illustrated in FIG. 1) are used to interconnect connector ports 44 on the patch panels 42 to respective ones of the connector ports 54 on the patch panels 52. The first and second equipment racks 40, 50 may be located in close proximity to each other (e.g., side-by-side) to simplify the routing of the patch cords 46.

As is further shown in FIG. 1, network equipment such as, for example, one or more switches 62 and network routers and/or routers 66 are mounted on a third equipment rack 60. Each of the switches 62 may include a plurality of jacks 64. A second set of patch cords 56 connect the jacks 64 on the switches 62 to the back end of respective ones of the jacks 54 on the patch panels 52. Note that, in the example of FIG. 1, the first end of the patch cord 56 is directly terminated into the back of one of the jacks 54, while the second end of patch cord 56 includes a plug connector. As is also shown in FIG. 1, a third set of patch cords 70 may be used to interconnect other of the jacks 64 on the switches 62 with jacks 68 that are provided on the network routers 66. In order to simplify FIG. 1, only a single patch cord 56 and a single patch cord 70 are shown. Finally, one or more external communications lines 72 are connected to, for example, one or more of the network routers 66 (either directly or through one or more patching devices).

The communications patching system of FIG. 1 may be used to connect each computer, printer, facsimile machine and the like 12 located throughout the building to local area network ("LAN") switches 62. The LAN switches 62 are connected to the network routers 66, and the network routers 66 are connected to external communications lines 72, thereby establishing the physical connectivity required to give devices 12 access to both local and wide area networks. In the patching system of FIG. 1, connectivity changes are typically made by rearranging the patch cords 46 that interconnect the jacks 44 on the patch panels 42 with respective of the jacks 54 on the patch panels 52.

The equipment configuration shown in FIG. 1, in which each wall jack 20 is connected to the network equipment 62, 66 through at least two patch panels 42, 52, is referred to as a "cross-connect" patching system. In another commonly used equipment configuration, which is typically referred to as an "inter-connect" patching system, the communications path from each modular wall jack 20 to the network equipment 62, 66 typically passes through a single patch panel (e.g., equipment rack 40 is omitted from the system of FIG. 1, and the cables 22 are connected into the reverse side of the patch panels 52). In such interconnect systems, patching changes are made by rearranging the patch cords 56 that run between the patch panels 52 and the network switches 62.

Electronic equipment such as, for example, the computers, switches and routers servers depicted in FIG. 1 above can be susceptible to electronic static discharge ("ESD"). ESD occurs when a static charge accumulates on a first object and the first object comes in close proximity or contact with a second object, thereby allowing the charge to suddenly transfer to the second object. In some instances the charge can be very large such as, for example, on the order of several thousand volts. Unfortunately, charges of this magnitude can cause catastrophic damage to many types of electronic equipment.

In hardwired telecommunications systems such as the exemplary system depicted in FIG. 1, the horizontal cabling (cables 22 in FIG. 1) and/or the patch cords (e.g., patch cords 46, 56 in FIG. 1) can become charged. If a cable 22 becomes charged, then when the patch cords 46, 56 are fully connected (i.e., when the first end of patch cord 46 is inserted into a jack 44 on one of the patch panels 42, the second end of patch cord 46 is inserted into a jack 54 on one of the patch panels 52 and the end of patch cord 56 that includes a plug is inserted into a jack 64 on one of the switches 62), then the charge can be transferred from the cable 22, through the patch cord 46, through the patch cord 56 to the switch 62 where the charge is discharged. Similarly, if either of the patch cords 46 or 56 become charged before they are plugged in, the charge on the patch cord can be transferred to the switch 62 when the patch cords 46 and/or 56 are inserted in their corresponding jacks. In either case, the switch 62 can be damaged by the electronic static discharge of the charge that was present on the cable 22 or one of the patch cords 46, 56. If the patch cord 70 that connects the switch 62 to the router 66 becomes charged before it is connected, it can discharge into either the switch 62 or the router 66 when the patch cord 70 is connected (it would discharge into the piece of equipment into which the patch cord 70 was first connected). In all of these situations, the electronic static discharge can damage or even destroy the effected piece of equipment (i.e., switch 62 or router 66).

In order to prevent such damage, patch panels and/or switches may include a grounded jack (typically on a side surface). The contact wires of this grounded jack are each coupled to ground. Before installing a patch cord into a normal jack of such a patch panel or switch, the installing technician is supposed to first plug the patch cord into the grounded jack to discharge any built up static charge to ground. Then the technician would plug the other end of the patch cord into the normal jack on the patch panel to discharge any static charge on the cable attached to the normal panel jack. The patch cord may then be plugged into the normal jack without the risk of ESD damage. Additionally, jacks are also known which include grounding circuits that automatically ground a patch cord as it is being inserted into the jack. An example of such a jack is disclosed in U.S. Pat. No. 7,431,600.

SUMMARY

Pursuant to embodiments of the present invention, communications patching devices such as patch panels are provided that include a mounting frame and a first jack that is mounted to the mounting frame. The first jack has a plurality of input terminals, a plurality of output terminals and a wiring board that includes a plurality of conductive paths that each electrically connect a respective one of the input terminals to a respective one of the output terminals. The wiring board further includes a plurality of electronic static discharge ("ESD") circuits. Each ESD circuit provides a path for discharging static charges to ground.

In some embodiments, each ESD circuit comprises a spark gap circuit that includes a conductive trace on the wiring board that is positioned immediately adjacent to a respective one of the conductive paths. In these embodiments, the conductive trace is electrically connected to ground. Moreover, the plurality of conductive paths may be arranged as a plurality of differential pairs of conductive paths that are each configured to carry a differential signal. In such embodiments, a spark gap circuit may be provided for at least one of the conductive paths of each of the plurality of differential pairs of conductive paths.

In some embodiments, a conductive element may extend from the wiring board. This conductive element electrically connects the conductive traces of each of the spark gap circuits to ground. This conductive element may comprise, for example, a pin that is received within a metal-plated hole in the wiring board. In some embodiments, this pin may be configured to directly contact a metal portion of the mounting frame, and the mounting frame may be connected to ground.

The communications patching device may also include a plurality of additional jacks that are mounted to the mounting frame. Each of the additional jacks has a plurality of input terminals, a plurality of output terminals and a wiring board that includes a plurality of conductive paths that each electrically connect a respective one of the input terminals to a respective one of the output terminals. A plurality of spark gap circuits are provided on these wiring boards, wherein each spark gap circuit provides an electronic static discharge path for a respective one of the plurality of conductive paths. In some embodiments, the patching device may comprise a power-over-Ethernet enabled patch panel.

Pursuant to further embodiments of the present invention, RJ-45 jacks are provided that include a housing that defines a plug receiving cavity that is configured to receive a mating RJ-45 plug. These jacks further include first through eighth contacts that are configured as four differential pairs of contacts. Each of the first through eighth contacts extends into the plug receiving cavity and each of the first through eighth contacts has a plug contact region that is positioned to make physical and electrical contact with a respective blade of the mating RJ-45 plug when the mating RJ-45 plug is received within the plug receiving cavity. The jack further includes first through fourth spark gap circuits that are mounted in a forward portion of the housing. Each spark gap circuit is aligned with the plug contact region of a respective one of the first through eighth contacts.

In some embodiments, each spark gap circuit comprises a contact pad on a wiring board that is aligned above a respective one of the blades of the mating RJ-45 plug when the plug is partially inserted within the plug receiving cavity. In such embodiments, the RJ-45 jack includes a conductive element extending from the wiring board to outside of the housing. This conductive element may be electrically connected to ground and to a plurality of conductive traces on the wiring board that connect each of the contact pads of the spark gap circuit to the conductive element. In some embodiments, the conductive element may be a pin that is received within a metal-plated hole in the wiring board, where the pin is configured to directly contact a metal portion of the mounting frame. The mounting frame is connected to ground.

In some embodiments, the plurality of spark gap circuits may comprise a conductive lead frame structure that includes a plurality of fingers. Each finger may be aligned above a respective one of the blades of the mating RJ-45 plug when the plug is partially inserted within the plug receiving cavity. The jack may further include a conductive element extending from the conductive lead frame structure to outside of the housing where the conductive element is electrically connected to ground.

Pursuant to further embodiments of the present invention, methods of protecting a piece of electronic equipment from electronic static discharge of charge that has accumulated on a patch cord or cable are provided. Pursuant to these methods, the first plug of the patch cord is inserted into a modular wall jack that is directly connected by a communications cable to a patch panel jack. This patch panel jack includes a plurality of ESD circuits, where each ESD circuit provides a path for discharging static charges to ground. The second plug of the patch cord is inserted into the piece of equipment after the first plug of the patch cord is inserted into the modular wall jack. A first plug of a second patch cord may be inserted into the patch panel jack to discharge any charge that has accumulated on the second patch cord. Thereafter, a second plug of the second patch cord may be inserted into a second piece of equipment.

DETAILED DESCRIPTION

The present invention is described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

As used herein, the terms "attached" or "connected" can mean either a direct or an indirect attachment or connection between elements. In contrast, the terms "directly attached" and "directly connected" refer to a direct attachment and direct connection, respectively, without any intervening elements.

Pursuant to embodiments of the present invention, communications patching devices such as patch panels and switches are provided that have jacks that can automatically discharge the cable and/or patch cords that are connected thereto. The patching devices of the present invention can thus reduce and/or eliminate the need for technicians to connect patch cords to a grounded jack before plugging the patch cord into a patch panel or switch. The patching devices of the present invention also automatically provide ESD protection, and hence do not require that technicians always remember to ground a patch cord before plugging the patch cord into a patching device. Moreover, as the ESD protection can be built into each jack in the patching device, ESD protection may be provided with respect to not only charged patch cords on either end of the channel, but also with respect to charged horizontal cabling that could damage equipment on either end of the channel. Moreover, in certain embodiments of the present invention, the ESD discharge circuits do not directly ground the patch cord or horizontal cabling, but do so, for example, through a spark gap. As such, the ESD protected patching devices according to certain embodiments of the present invention may be used with power-over-Ethernet implementations.

Figure 2:
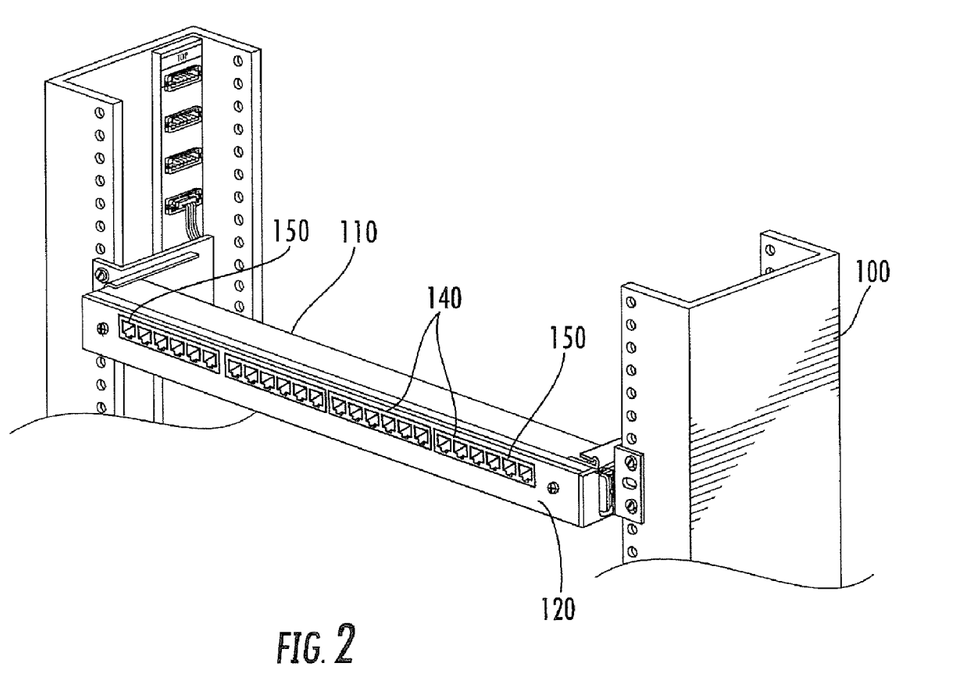
FIG. 2 is a perspective view of a patch panel according to embodiments of the present invention.

FIG. 2 is a perspective view of a patch panel 110 according to embodiments of the present invention that is mounted on an equipment rack 100. As shown in FIG. 2, the patch panel 110 includes a mounting frame 120 and a plurality of communications inserts 140. Each communication insert 140 is mounted to a bezel 130 (not readily visible in FIG. 2) that is mounted to the mounting frame 120. Thus, each bezel 130 is used to mount a respective one of the communications inserts 140 to the mounting frame 120. The bezels 130 may comprise, for example, plastic inserts that fit into openings in the mounting frame 120.

Each of the communications inserts 140 includes a plurality of jacks 150. In the exemplary embodiment depicted in FIG. 2, the patch panel 110 includes four communications inserts 140, each of which include six jacks 150 for a total of twenty-four communications jacks on the patch panel 110.

Figure 3:
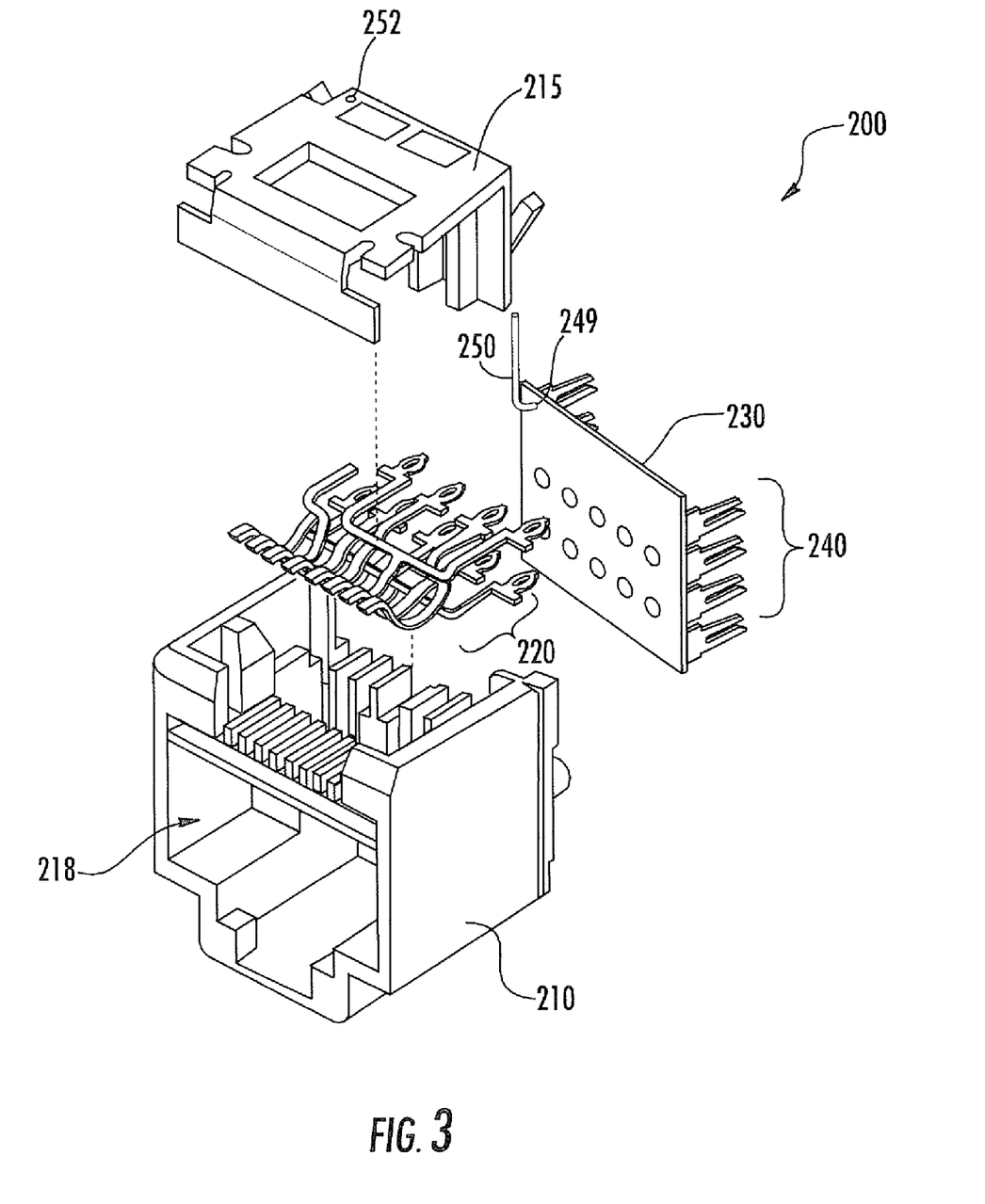
FIG. 3 is an exploded perspective view of a jack according to embodiments of the present invention that can be used in the patch panel of FIG. 2.

FIG. 3 is an exploded perspective view of a jack 200 according to embodiments the present invention that can be used in the patch panel 110 of FIG. 2. The jack 200 includes a housing 210, 215, a plurality of jackwire contacts 220, a vertically-oriented wiring board 230, and a plurality of wire connection terminals 240.

As shown in FIG. 3, the housing is a multi-piece housing that comprises a jack frame 210 and a top cover 215. The housing will also typically include a terminal cover (not shown in FIG. 3) that covers and protects the wire connection terminals 240. The jack frame 210, top cover 215 and the terminal cover may be made of a suitable insulative plastic material that meets all applicable standards with respect to, for example, electrical breakdown resistance and flammability such as, for example, polycarbonate, ABS, and blends thereof. While jack 200 includes a specific multi-piece housing, it will be appreciated that the housing may be any conventional or unconventional housing structure, and may comprise a one-piece housing in some embodiments. The jack frame 210 includes a plug receiving cavity 218 that receives a mating plug.

The wiring board 230 is mounted vertically at the back of the jack frame 210, and each of the eight jackwire contacts 220 are mounted in the wiring board 230 in a conventional fashion such as, for example, by press-fitting the compliant pin terminations of each jackwire contact into a respective one of the metal-plated holes in the wiring board 230. A plurality of wire connection terminals 240 (which are implemented as insulation displacement contacts or "IDCs" in the jack of FIG. 3) are mounted on the back side of the wiring board 230. Each of the IDCs 240 is connected to a respective one of the jackwire contacts 220 via conductive traces/paths on the wiring board 230. The wiring board 230 may comprise any type of substrate that includes the above-referenced conductive paths that connect each jackwire contact 220 to a respective one of the wire connection terminals 240 such as, for example, a multi-layered printed circuit board. The wiring board 230 may also include electrical circuit components or devices arranged on or within the board to improve return loss and/or to compensate for crosstalk that may otherwise be present in the jack 200 and/or in an associated plug that mates with the jack 200. Such devices may include, but are not limited to, closely spaced conductive traces printed on or within layers of the wiring board 230, plate capacitors implemented on two or more layers or surfaces of the board, inter-digitated finger capacitors such as the interdigitated finger capacitors disclosed, for example, in U.S. Pat. No. 5,997,358, and discrete electrical components such as inductors, capacitors or resistors that are mounted on or within the wiring board 230.

As is also shown in FIG. 3, the jackwire contacts 220 are cantilevered from the rear of jack 200 toward the front of jack 200 so as to extend into the plug receiving cavity 218. The jackwire contacts 220 depicted in FIG. 3 are one such type of contact that is known in the art. The contacts 220 are referred to as "jackwire" contacts because the contacts are configured to resiliently deflect from a resting position when contacted by a mating plug, and then recover or "spring back" to the resting position when the mating plug is removed. Each contact 220 includes a plug contact region that is configured to make mechanical and/or electrical contact with a blade of a plug that is inserted into the jack 200. Each jackwire contact 220 may be formed, for example, of a copper alloy such as spring-tempered phosphor bronze, beryllium copper, or the like. A typical cross-section of each jackwire contact 220 is 0.017 inch wide by 0.010 inch thick, although other sized and/or shaped (e.g., round) contacts may be used.

As shown in FIG. 3, some of the contacts include a "crossover" in that one contact crosses over or under another contact. Additionally, two of the contacts also include a support beam that is mounted into the wiring board 230. While the contacts 220 of the jack 200 depicted in FIG. 3 show one possible jackwire contact configuration, it will be appreciated that essentially any contact configuration will work with embodiments of the present invention. Accordingly, the jackwire contacts 220 may have the same or different profiles, may or may not be generally aligned in a side-by-side relationship (except to the extent that general alignment is required in the plug contact region of the contacts to conform to industry standards), may or may not include crossovers, may have different numbers of crossovers, may have staggers, may be cantilevered from the front, etc.

As is further shown in FIG. 3, the wiring board 230 includes an extra metal plated aperture 249. One end of a conductive pin 250 is received within the aperture 249. The conductive pin 250 includes a 90 degree turn just above the surface of the wiring board 230. From this 90 degree turn, the conductive pin extends upward and through an opening 252 in the top cover 215 where it can contact, for example, the mounting frame 120 of the patch panel 110. As discussed herein, this connection to the mounting frame 120 (or to some other structure) may be used to connect the conductive pin 250 to ground.

While the jack 200 of FIG. 3 illustrates one exemplary patch panel jack having ESD protection, it will be appreciated that the techniques of the present invention can be used on a wide variety of different jack configurations.

Figure 4:
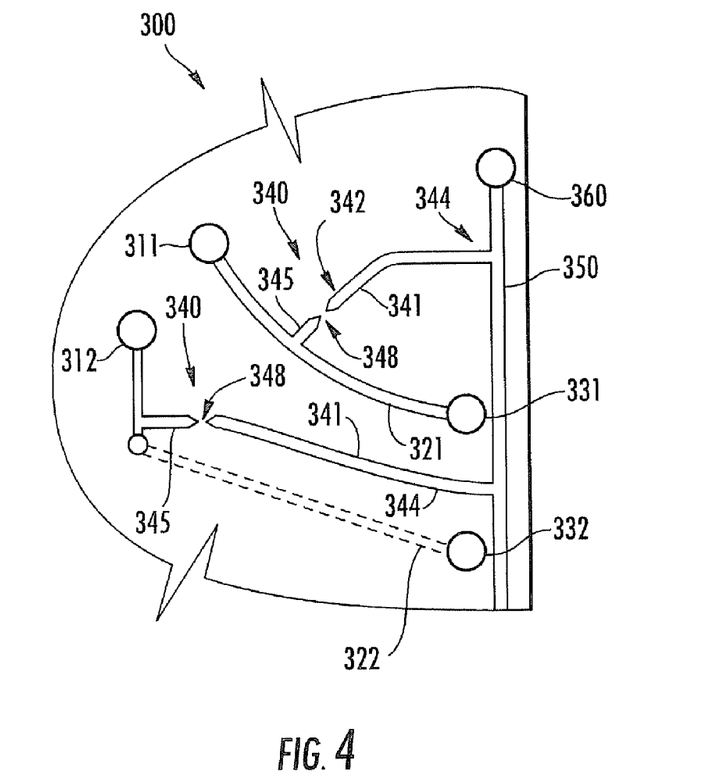
FIG. 4 is a plan view of a portion of a printed circuit board for a jack according to embodiments the present invention that includes spark gap circuits that provide ESD suppression.

FIG. 4 is a plan view of a portion of a printed circuit board 300 according to certain embodiments the present invention. The printed circuit board 300 could be used, for example, as the wiring board 230 of the jack 200. The printed circuit board 300 may be a single layer printed circuit board or, more typically, a multi-layer printed circuit board that includes conductive traces on at least two sides or layers thereof. The printed circuit board 300 includes a plurality metal-plated holes 311-318 (only holes 311 and 312 are visible in FIG. 4) which receive the jackwire contacts (e.g., jackwire contacts 220 of the jack 200) and a plurality of metal-plated holes 331-338 (only holes 331 and 332 are visible in FIG. 4) that receive the wire connection terminals (e.g., the IDCs of the jack 200). The printed circuit board 300 further includes a plurality of conductive paths 321-328 (only conductive paths 321 and 322 are visible in FIG. 4), each of which connects a respective one of the metal-plated holes 311-318 to a respective one of the metal-plated holes 331-338. The printed circuit board 300 may also include capacitive crosstalk compensation circuits such as, for example, inter-digitated finger capacitors or plate capacitors and/or inductive crosstalk compensation that is provided, for example, by routing two of the conductive paths 321-328 in a side-by-side closely spaced fashion.

Figure 4A:
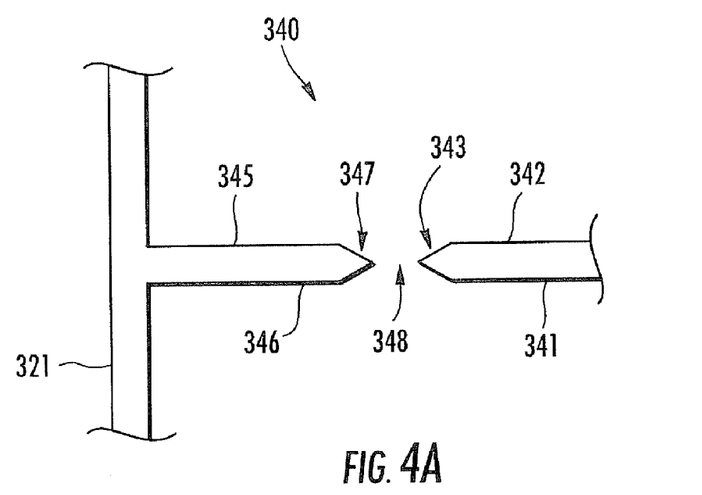
FIG. 4A is an enlarged plan view of one of the spark gap circuits of FIG. 4.

As shown in FIG. 4, a plurality of spark gap circuits 340 (two such spark gap circuits 340 are visible in FIG. 4) are also provided on the printed circuit board 300. A "spark gap circuit" is a circuit which provides an electrical connection to ground (or other reference voltage) via two conductive elements that are separated by a small gap. A first of the conductive elements is connected to ground. If an electrical signal having a sufficiently large voltage is present on the second conductive element (i.e., on the conductive element on the opposite side of the gap from ground), the signal will arc across the gap, thereby discharging at least much of the electrical signal to ground. FIG. 4A is an enlarged view of one of the spark gap circuits 340 of FIG. 4, As shown in FIGS. 4 and 4A, each spark gap circuit 340 may be implemented as a ground trace 341 that is brought in close proximity to one of the conductive paths 321-328 that carry signals from one of the metal-plated holes 311-318 to a respective one of the metal-plated holes 331-338. The ground trace 341 may comprise for example, a trace that includes a first end 342 that is pointed towards a respective one of the conductive paths. In some embodiments, the first end 342 may come to a tip 343. The second end 344 of the ground trace 341 may be connected to a ground line 350 which is described in more detail below.

As is also shown in FIGS. 4 and 4A, the conductive paths 321-328 may include an extension 345 that has a first end 346 that is directly adjacent to the first end 342 of the ground trace 341. The first end 346 of the extension may also have a tip 347. The tips 343 and 347 are separated by a gap 348. In some embodiments, this gap 348 may be, for example, about 0.01 to about 0.02 inches.

As is further shown in FIG. 4, a metal-plated hole 360 is also provided on the printed circuit board 300. The metal-plated hole 360 may receive the conductive pin 250 discussed above with respect to FIG. 3 or some other conductive element that is connected to an external ground. As shown in FIG. 4, the second end 344 of each ground trace 341 may be connected to the ground line 350. The ground line 350, in turn, is connected to the metal-plated hole 360. Thus, the conductive pin 250 (or other structure) and the metal-plated hole 360 may provide an electrical path to ground that is used to electrically ground each of the ground traces 341.

The spark gap circuits 340 may operate as follows. During normal operation, the conductive traces 321-328 carry low voltage communications signals. The voltages on these signals are insufficient to jump the gap 348 between one of the conductive paths 321-328 and the ground trace 341 of its respective spark gap circuit 340. In contrast, when a high voltage ESD is transferred to the conductive paths 321-328, the charge can jump the small gap 348, thereby providing a direct connection to ground. Thus, the spark gap circuits 340 may be used to dissipate a charge that is introduced into the jack 200 from either a patch cord or a cable that is attached to jack 200. In this fashion, the spark gap circuits 340 can protect equipment that is attached to either end of the channel that flows through the jack 200 from ESD.

It will be appreciated that numerous modifications may be made to the spark gap circuits 340. By way of example, either or both of the tips 343 and 347 on the ground trace 341 and the extensions 345 of the conductive paths 321-328 may be omitted. The conductive paths 321-328 need not include the extension 345. Likewise, a first end 342 of the ground trace 341 need not point toward its respective conductive path 321-328. Instead, the ground trace 341 may run, for example, in parallel to the conductive trace 321-328 with a gap 348 therebetween. Each spark gap circuit 340 may include its own ground line 350 and/or metal-plated hole 360.

Figure 5:
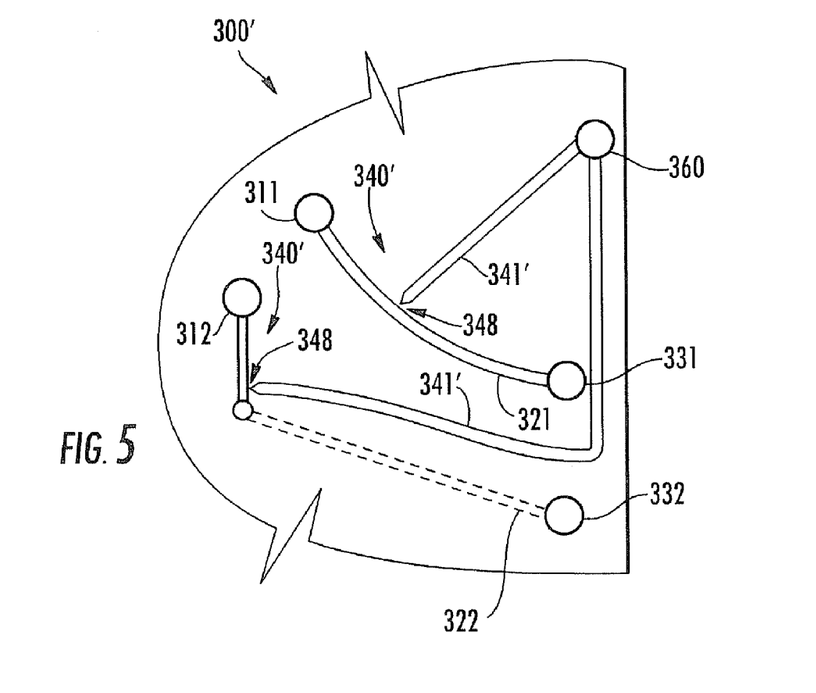
FIG. 5 is a plan view of a portion of a printed circuit board for a jack according to further embodiments of the present invention that includes spark gap circuits that provide ESD suppression.

It will also be appreciated that, in some embodiments, the conductive trace 341 and the ground line 350 may be implemented as a single conductive trace on the printed circuit board. FIG. 5 illustrates a printed circuit board 300' which includes spark gap circuits 340' that are each implemented as a single conductive trace 341' that connects directly to the metal-plated hole 360. As shown in FIG. 5, each conductive trace 341' includes a section that runs close to a respective one of the conductive traces 321-328 such that a small gap 348' is provided between the two traces (only two spark gap circuits 340' are pictured in FIG. 5). Thus, it will be appreciated that the implementations of the spark gap circuits depicted in FIGS. 4 and 5 are exemplary in nature, and that numerous additional implementations are possible and that all such implementations fall within the scope of the present invention.

Spark gap circuits may have relatively slow reaction times, and can also degrade with use. By implementing the spark gap circuits in the jacks in the patch panel, the spark gap circuits should have more than sufficient time to discharge a charged cable or patch cord, as there should be an appreciable delay before the second end of a patch cord is plugged into ESD sensitive equipment. It is also not anticipated that a typical patch panel according to embodiments of the present invention will have to discharge a large number of times during typical, expected use conditions, and hence the degradation aspects of spark gap circuits are also not expected to be a major concern.

In some embodiments of the present invention, a spark gap circuit such as spark gap circuit 340 would be provided for all of the conductive paths 321-328 on the printed circuit board 300. However, it will be appreciated that in other embodiments fewer spark gap circuits could be provided. For example, in some embodiments a spark gap circuit would only be provided on one of the conductive paths of each differential pair of conductive paths (e.g., on conductive paths 321, 323, 325 and 327).

Figure 6:
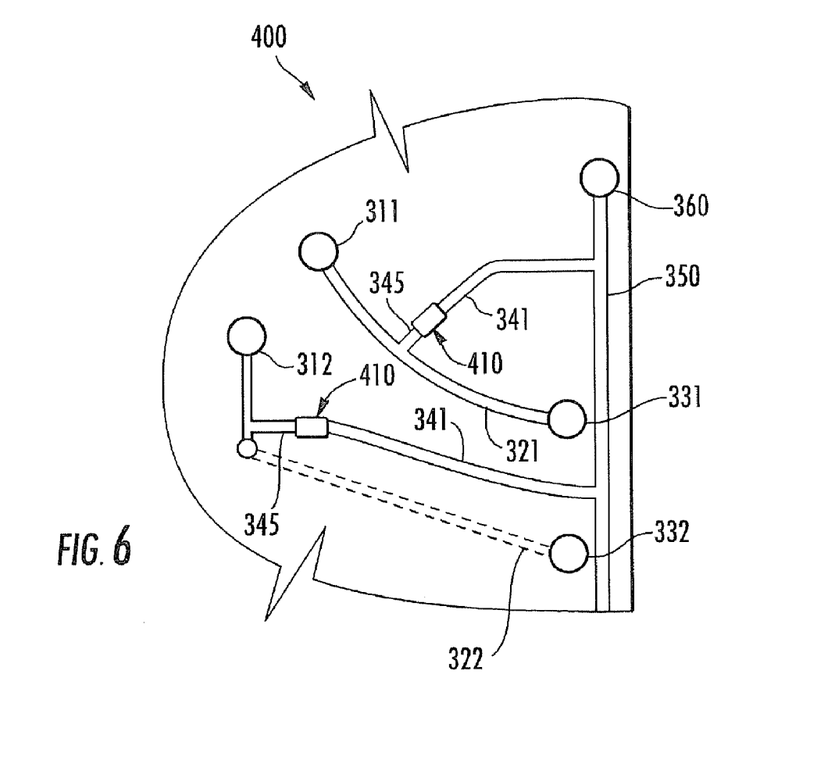
FIG. 6 is a plan view of a portion of a printed circuit board for a jack according to still further embodiments of the present invention that includes surface mounted ESD suppressors.

FIG. 6 is a plan view of a portion of a printed circuit board 400 according to further embodiments of the present invention. The printed circuit board 400 may be identical to the printed circuit board 300 discussed above with respect to FIG. 4 except that the spark gap circuits 340 and grounding paths 350, 360 of the circuit board 300 are replaced with surface mount ESD suppressors. As such, the elements of the printed circuit board 400 that are common to the printed circuit board 300 will not be re-described here. The printed circuit board 400 could be used, for example, in the communications jack 200 discussed above with respect to FIG. 3.

As shown in FIG. 6, the printed circuit board 400 includes a plurality of surface mount ESD suppressors 410 mounted thereon. Surface mount ESD suppressors that can be mounted on a printed circuit board are commercially available such as, for example, the PGB1 Series of PulseGuard surface mount polymeric ESD suppressors available from Littlefuse® (www.littlefuse.com). As shown in FIG. 6, each surface mount ESD suppressor 410 is soldered between conductive trace 321 and ground trace 341. The traces 321 and 341 are electrically separated by a large gap. A second surface mount ESD suppressor 410 is similarly mounted between conductive path 322 and a second ground trace 341. In some embodiments, each surface mount ESD suppressor 410 may comprise a zener diode. During normal operation, low voltage communications signals simply travel down the conductive paths 321, 322 and little or no signal energy passes through the surface mount ESD suppressors 410 provided along each respective conductive path 321, 322. However, when a high voltage charge is discharged through the printed circuit board 400, the zener diode will breakdown causing current to flow between conductive path 321 and its respective ground trace 341 and/or between conductive path 322 and its respective ground trace 341, thereby clamping the high voltages on conductive traces 321 and/or 322 to a lower voltage.

While FIG. 6 only shows a small portion of the printed circuit board 400, it will be appreciated that a surface mount ESD suppressor 410 would typically be provided for at least one of the conductive paths 321-328 of each of the four differential pairs of conductive paths, and that, most typically, a surface mount ESD suppressor 410 would be provided for all eight of the conductive paths 321-328.

Figure 7:
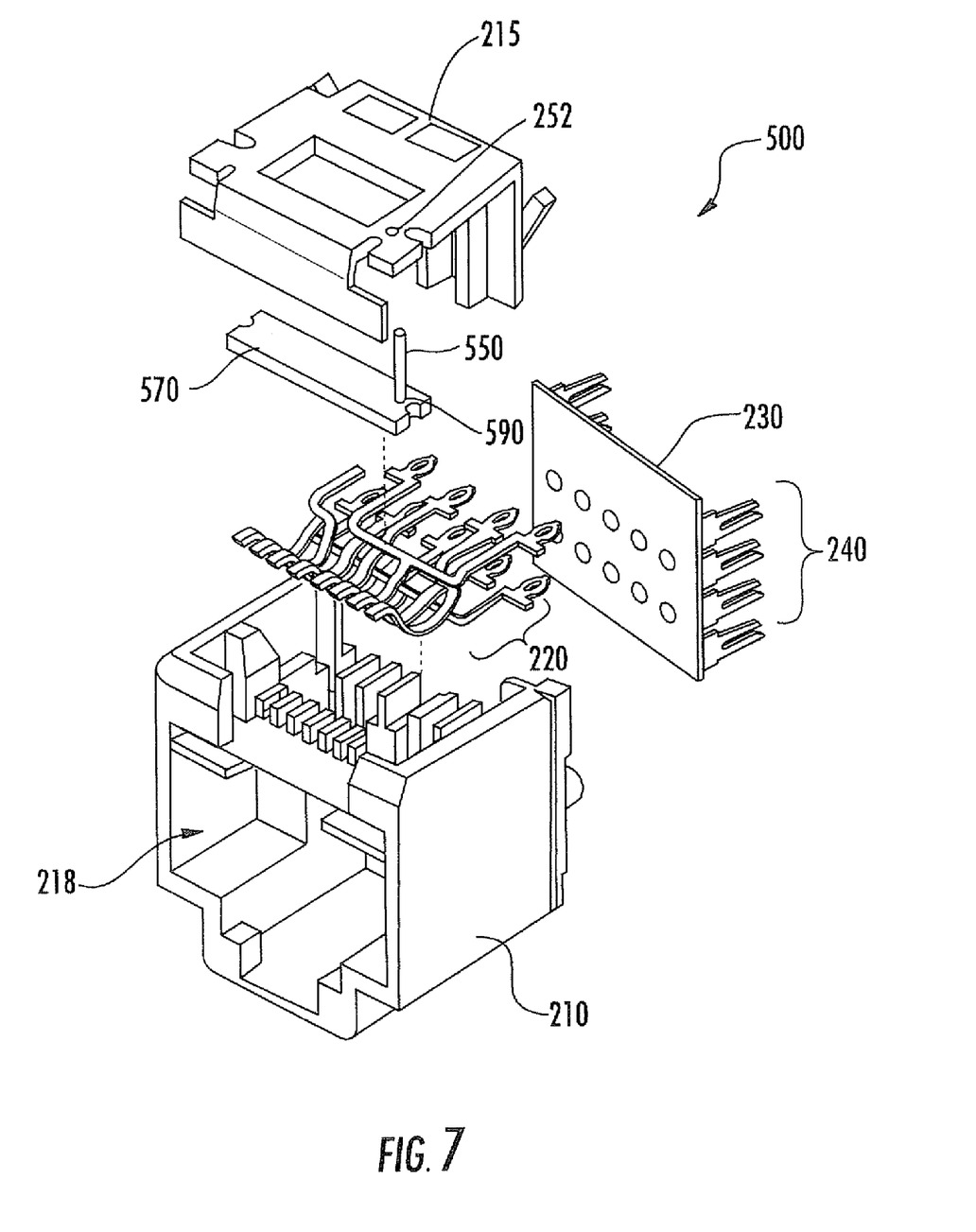
FIG. 7 is an exploded perspective view of a jack according to further embodiments of the present invention that can be used in the patch panel of FIG. 2.

FIG. 7 is an exploded perspective view of a jack 500 according to further embodiments of the present invention. The jack 500 can be used, for example, in the patch panel 210 of FIG. 2. As shown in FIG. 7, the jack 500 is similar to the jack 200 of FIG. 3. Accordingly, like numbered elements of jack 500 will not be described here as they have already been described above with respect to FIG. 3. However, the jack 500 includes a second, horizontally mounted printed circuit board 570, and the grounding pin 250 of the jack 200 is replaced with a grounding pin 550 that is mounted in the horizontally-oriented printed circuit board 570 instead of the vertically-oriented printed circuit board 230.

In the jack 500, the ESD suppression circuitry is implemented in the horizontally-oriented printed circuit board 570. In particular, the printed circuit board 570 includes eight elongated contact pads 575 (see FIG. 7 and FIGS. 8A-8C) on its forward lower surface. As shown best in FIGS. 8A-8C (which are described below), each of these contact pads 575 runs generally parallel to, and aligned with, the plug contact region of a respective one of the jackwire contacts 220, and is positioned forward of the distal end of its respective jackwire contact 220 (i.e., closer to the plug aperture). Consequently, each of these contact pads 575 is aligned so as to be parallel to a respective one of the blades of a mating plug 280 when such a plug 280 is inserted through the plug aperture into the plug receiving cavity 218.

Figure 7A:
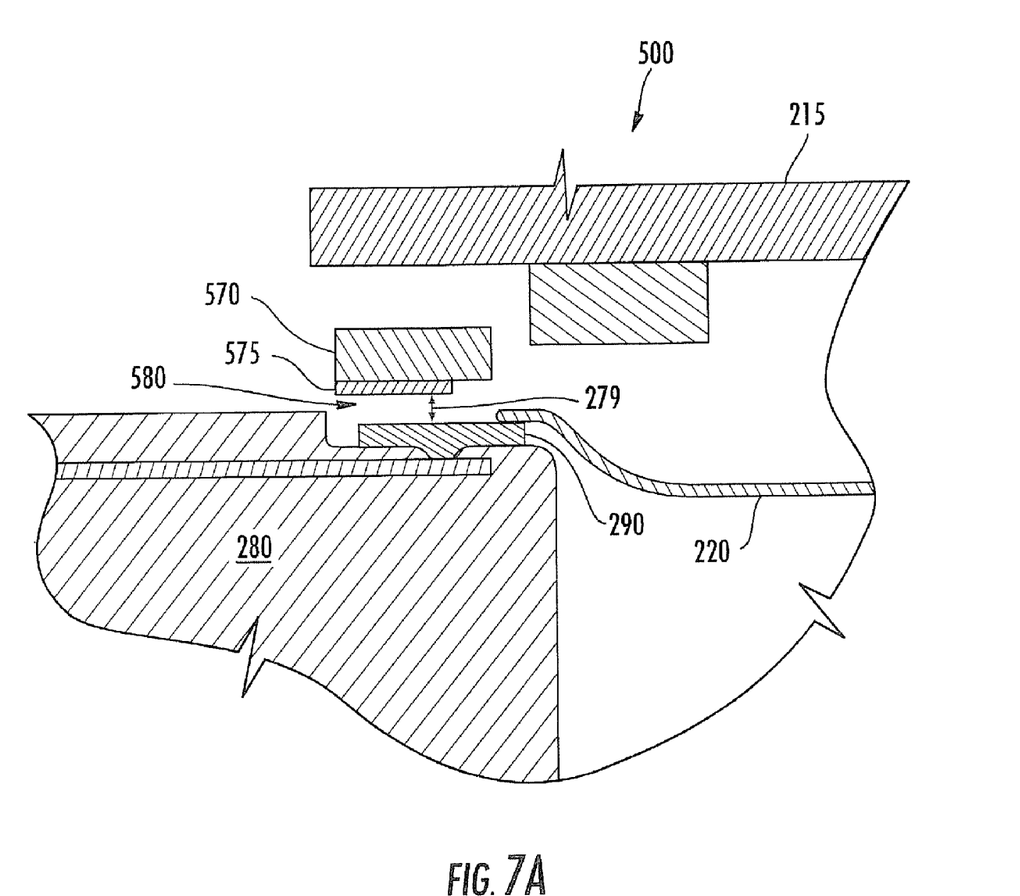
FIG. 7A is a cross-sectional view of a portion of the jack of FIG. 7 when a mating plug has been partially inserted within the jack.
Figure 8A:
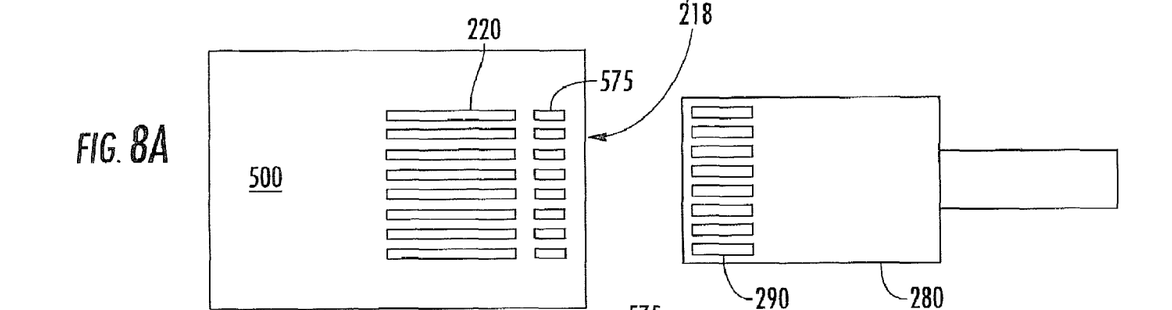
FIGS. 8A-8C are schematic plan views of the jack of FIG. 7 that illustrate how a plurality of grounding pins can be used to discharge a patch cord when a plug of the patch cord is inserted into the jack.
Figure 8B:
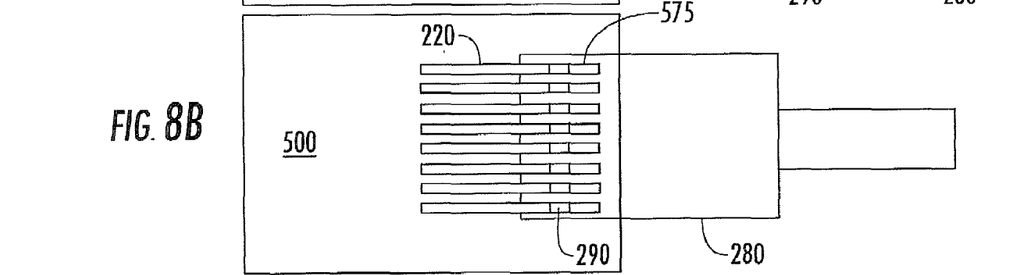

FIG. 7A is a cross-sectional view of the jack 500 taken along the longitudinal length of one of the contact pads 575 when a plug 280 is in the position shown in FIG. 8B. As shown in FIG. 7A, the horizontally-oriented printed circuit board 570 is positioned so that a small gap 279 will exist between each of the contact pads 575 and its respective blade 290 on the mating plug 280 when the mating plug 280 is inserted into the plug receiving cavity 218. As such, each contact pad 575 forms a spark gap circuit 580 with its respective blade 290 on the mating plug 280 when the mating plug 280 is being inserted into the plug receiving cavity 218. The horizontally-oriented printed circuit board 570 includes a metal-plated aperture 590 (see FIG. 7) which receives the conductive pin 550. Additionally, a ground line (not depicted in the figures) is provided on the printed circuit board 570 that connects each of the contact pads 575 to the metal-plated aperture 590. This ground line may, for example, be similar or identical to the ground line 350 depicted in FIG. 4. In this manner, each of the contact pads 575 are electrically connected to the conductive pin 550 and hence are electrically connected to ground.

Figure 8C:
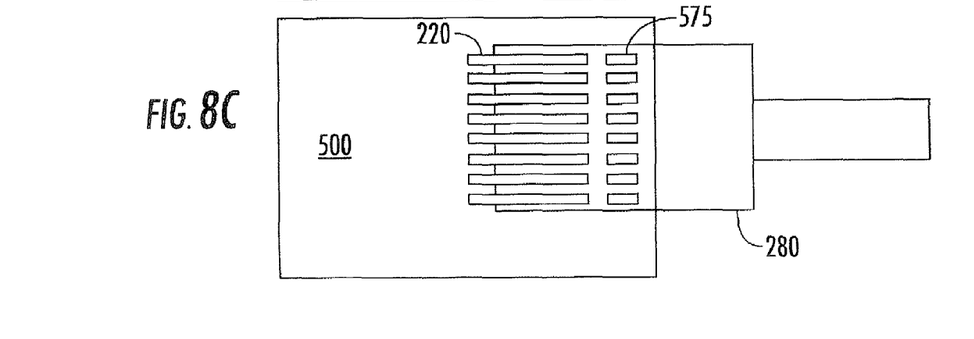

FIGS. 8A-8C are schematic plan views of the communications jack 500 of FIG. 7 that illustrate how the contact pads 575 can be used to discharge a charged patch cord when a plug 280 of the patch cord is inserted into the communications jack 500. As shown in FIG. 8A, each of the contact pads 575 is closer to the plug aperture than is the jackwire contact 220 that the contact pad 575 is aligned with. Accordingly, as shown in FIG. 8B, when the mating plug 280 is being inserted into the plug receiving cavity 218, the blades 290 of the plug 280 pass directly underneath the contact pads 575 and continue underneath the contact pads 575 as the blades 290 come into contact with the jackwire contacts 220. As noted above, the horizontally-oriented printed circuit board 570 is positioned so that a small gap 279 (e.g., about 0.01 inches) will exist between each blade 290 of the mating plug 280 and its respective contact pad 575 when the blades 290 pass beneath the contact pads 575 during the insertion of the plug 280 into the plug receiving cavity 218.

When the blades 290 of the mating plug 280 are in the position depicted in FIG. 8B, the contact pads 575 act as a series of spark gap circuits 580 that discharge any charge present on the patch cord that is attached to the mating plug 280. As is also shown in FIG. 8B, the jack 500 can be designed so that the blades 290 of the mating plug 280 initially come into contact with the jackwire contacts 220 when a portion of each blade 290 is still directly underneath its corresponding one of the contact pads 575. As the conductors in the cable attached to the back end of the jack 500 each have an electrical path to a respective one of the contact pads 575 when the plug 280 is in the position of FIG. 8B, the contact pads 575 may also act to discharge any charge that is present on the cable as well as any charge present on the patch cord that includes plug 280. As shown in FIG. 8C, once the mating plug 280 is fully inserted into the plug receiving cavity 218, the plug blades 290 pass beyond the contact pads 575. At this point, the contact pads 575 are no longer active.

In some applications there are requirements that during normal operation a plug and jack must withstand a high voltage that is applied to any conductive path without that high voltage arching to any other conductor or ground. In this present embodiment by opening (i.e., disabling) the spark gaps 279 after the plug 280 is fully inserted as shown in FIG. 8C, the spark gap spacing can be designed so that the spark gaps 279 will advantageously arch at a much lower voltage when the mating plug 280 is in the position of FIG. 8B, while the plug 280 and jack 500 will still pass a high voltage test when the plug 280 is fully inserted into the jack 500 in the position of FIG. 8C.

Figure 9:
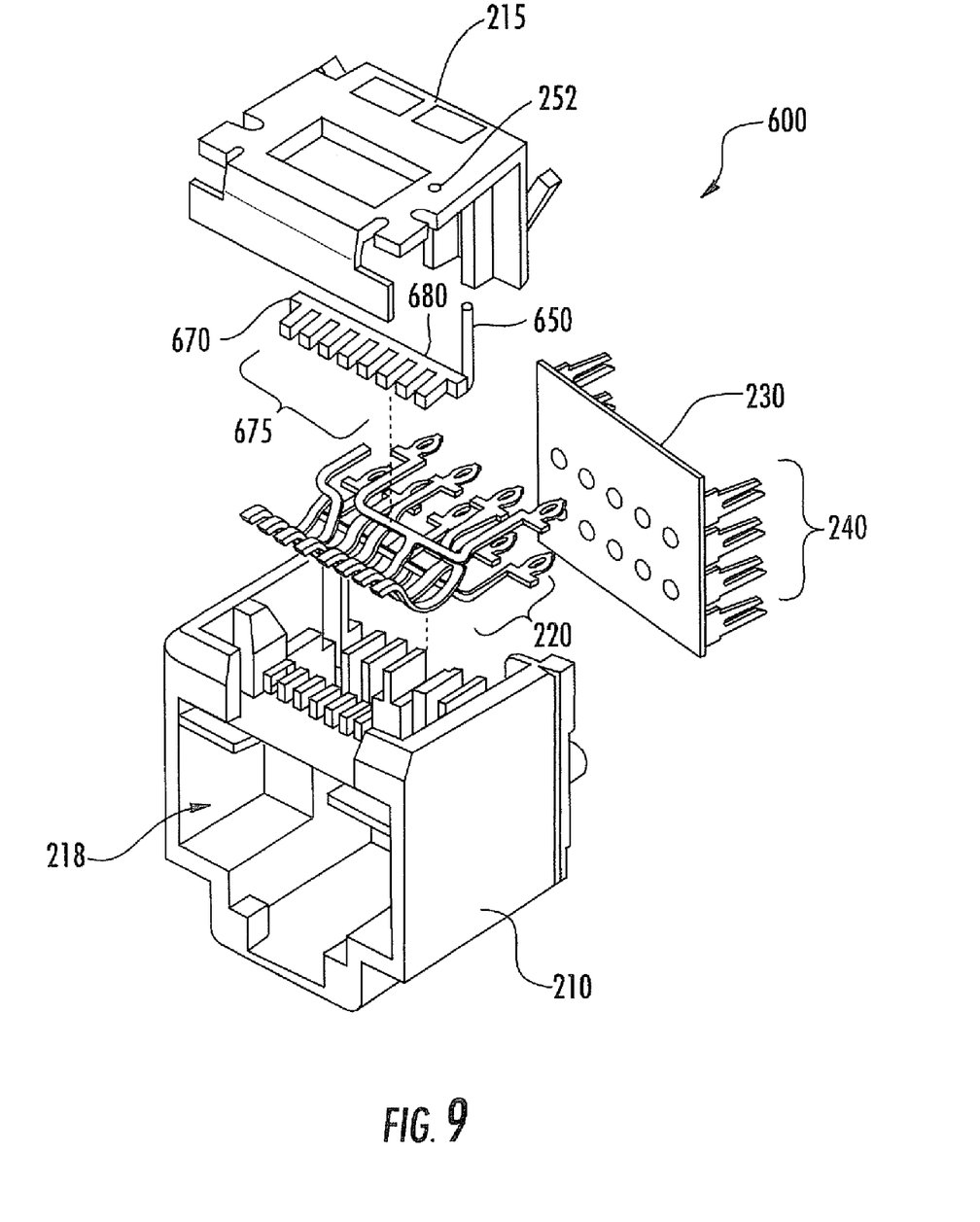
FIG. 9 is an exploded perspective view of a jack according to still further embodiments of the present invention that can be used in the patch panel of FIG. 2.

FIG. 9 is an exploded perspective view of a jack 600 according to still further embodiments of the present invention that can likewise be used in the patch panel of FIG. 2. The jack 600 is nearly identical to the jack 500, except that the horizontally oriented printed circuit board 570 of the jack 500 is replaced with a lead frame structure 670. As shown in FIG. 9, the lead frame structure may have a comb shape, with a plurality of prongs 675 running generally parallel to, and in alignment with, the plug contact region of a respective one of the jackwire contacts 220. Consequently, each of the prongs 675 is aligned so as to be in parallel to a respective one of the blades 290 of a mating plug 280 when such a plug 280 is inserted through the plug aperture into the plug receiving cavity 218.

The lead frame structure 670 is positioned so that a small gap will exist between each of the prongs 675 and its respective blade 290 on the mating plug 280 when the mating plug 280 is inserted into the plug receiving cavity 218. As such, each respective prong 675 forms a spark gap circuit with its respective blade 290 on the mating plug 280 when the mating plug 280 is being inserted into the plug receiving cavity 218. The base 680 of the lead frame structure 670 is attached to a conductive pin 650 that extends out of the housing through the aperture 252 to contact ground in a manner similar to the conductive pin 250 of the jack of FIG. 3. In some embodiments, the lead frame 670 and the conductive pin 650 may comprise a unitary piece of stamped metal that is bent into the depicted shape. It will be appreciated that the jack 600 may operate basically identically to the jack 500 in terms of providing ESD protection, and that FIGS. 8A-8C also describe how ESD protection may be accomplished in the jack 600.

As is known to those of skill in the art, some patching devices include jacks that each have their own individual printed circuit board. However, in other patching devices, one or more groups of the jacks may share a common printed circuit board. By way of example, GS6 patch panels available from CommScope, Inc. of Hickory, N.C., include communications modules that have six jacks each, which share a single, common printed circuit board that was used to form a "six-pack" of jacks.

In patching devices that have multiple jacks that share a common printed circuit board, the grounding structure can be simplified, if desired. For example, if the jack 200 of FIG. 3 were implemented as part of a "six-pack" of jacks that share a common printed circuit board 300, a single ground line 350 and metal-plated aperture 360 may be provided on the printed circuit board 300 that would provide the connection to ground for all six jacks of the six-pack. This can simplify the design of the patching device, and reduce the number of conductive pins 250 that are required (which is a part that may be more susceptible to damage) in order to provide a ground connection for the ESD suppression circuits.

As discussed above, communications jacks having ESD protection circuits are known in the art such as the jack disclosed in U.S. Pat. No. 7,431,600. Typically, these jacks would be implemented on equipment that was to be protected from ESD such as computers, servers and the like. The ESD suppression circuits in these jacks act to discharge any charge that is present on a patch cord that is plugged into the piece of equipment. Pursuant to embodiments of the present invention, ESD protection circuits are implemented on the jacks of patching devices such as patch panels. As the jacks on patch panels typically serve as a connection point between a patch cord and a communications cable (or between two patch cords), the ESD protection circuits according to embodiments of the present invention can act to protect equipment on both ends of the communications channel.

The jacks having ESD protection circuits according to embodiments of the present invention may also be used in power-over-Ethernet ("POE") implementations. As known to those of skill in the art, POE refers to supplying power over communications cabling to devices attached to the end of the cabling. Wireless access points, Internet Protocol phones, cameras, and similar devices that connect to networks for communications purposes can also use the power from the cabling thru the same connection, thereby eliminating the need for a separate power connection. A POE device that supplies the power can reside, for example, in either the communication switch 62 or in the patch panel 52 of FIG. 1. Since the conductive paths through each jack on a POE implementation carry an electrical power signal, it typically is undesirable to connect these conductive paths directly to ground, as may occur on a panel using conventional ESD protection circuits such as the ESD protection circuit provided on the jack disclosed in U.S. Pat. No. 7,431,600 were the patch cord removed from the panel jack while power is being supplied. As the above-described jacks do not directly connect the conductive paths through the communications connector to ground, but instead use spark gap circuits or surface mount ESD suppressors, they will not short out any POE signal that is carried on the conductive paths from the POE switch or patch panel. As such, the jacks according to embodiments of the present invention may be implemented with POE patch panels such as, for example, the patch panels disclosed in U.S. patent application Ser. No. 11/771,125, filed Jun. 29, 2007.

It will be appreciated that the above-described embodiments are merely exemplary in nature, and that numerous modifications may be made thereto without departing from the scope of the present invention. For example, in some embodiments, the metal-plated hole in a printed circuit board that receives a conductive pin (or other conductive element) could be replaced with a conductive contact pad. As another example, the conductive pin could reside on the mounting frame of the patch panel and, when the jack is inserted into the mounting frame, the conductive pin would be guided thru a hole in the jack housing to come in contact with a contact pad. In some embodiments there may be a conductive surface on all or part of the jack that is in contact with the ground trace and when the jack is inserted into the mounting frame, this conductive surface comes in contact with the ground on the mounting frame. In some embodiments a metal bar or strip the length of the patch panel with conductive pins would mount to the front or rear of the patch panel to provide a ground connection. This would allow for a plastic patch panel. In some embodiments, a small gap (e.g., less than 0.01 inch) may exist between the conductive pin or surface and the ground on the frame, as the ESD would still discharge across such a gap.

Figure 10:
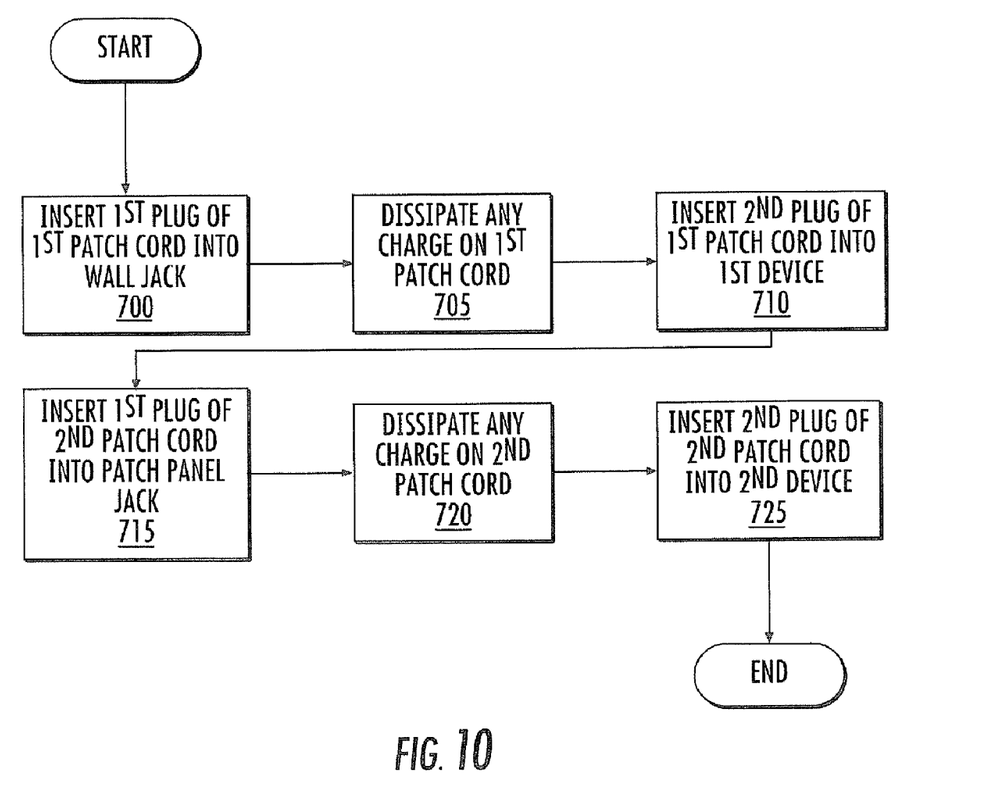
FIG. 10 is a flow chart illustrating methods of protecting equipment at both ends of a communication channel from ESD damage pursuant to embodiments of the present invention.

As discussed above, the patching devices of the present invention may protect equipment at both ends of a communication channel from ESD damage. Methods of providing such protection will now be discussed with respect to the flow chart of FIG. 10. As shown in FIG. 10, operations may start with a technician or other person connecting a first plug of a first patch cord into a modular wall jack that is directly connected by a communications cable to a jack of a patch panel (block 700). The patch panel jack includes a plurality of electronic static discharge ("ESD") circuits, wherein each ESD circuit provides a path for discharging static charges to ground. By way of example, the patch panel jack could be implemented as any of the jacks 200, 500 or 600 described above. If the first patch cord has picked up an electronic static charge, that charge is dissipated by the ESD circuits in the patch panel jack (block 705). Next, the technician or another person may connect the second plug of the first patch cord into a piece of equipment such as, for example, a computer in an office of a building (block 710). Next, a first plug of a second patch cord is inserted into the patch panel jack (block 715). If the second patch cord has picked up an electronic static charge, that charge is dissipated by the ESD circuits in the patch panel jack (block 720). Next, a second plug of the second patch cord may be inserted into a second piece of equipment such as, for example, a network switch (block 725).

It will be appreciated that the order of operations of the flow chart of FIG. 10 may be modified to an extent. The operations of blocks 715 and 720 (and 725 as well) may be performed before the operation of block 710. However, in each case, the plug on the end of the first patch cord that is connected to the wall jack is inserted before the second plug on the first patch cord is inserted into the jack on its piece of equipment, and the plug on the end of the second patch cord that is connected to the patch panel jack is inserted before the second plug on the second patch cord is connected to another piece of equipment. Any charge on the cable will be dissipated when it is connected to the patch panel or during the insertion of the patch cord.

Although exemplary embodiments of this invention have been described, those skilled in the art will readily appreciate that many modifications are possible in the exemplary embodiments without materially departing from the novel teachings and advantages of this invention. Accordingly, all That which is claimed is:

1. A communications patching device, comprising;
a mounting frame; and
a first jack mounted to the mounting frame, the first jack having a plurality of input terminals, a plurality of output terminals, a wiring board that includes a plurality of conductive paths that each electrically connect a respective one of the input terminals to a respective one of the output terminals, and a plurality of electronic static discharge ("ESD") circuits on the wiring board, wherein each ESD circuit provides a path for discharging static charges to ground.

2. The communications patching device of claim 1, wherein each ESD circuit comprises a spark gap circuit that includes a conductive trace on the wiring board that is positioned immediately adjacent to a respective one of the conductive paths, wherein the conductive trace is electrically connected to ground.

3. The communications patching device of claim 2, wherein the plurality of conductive paths are arranged as a plurality of differential pairs of conductive paths that are each configured to carry a differential signal, and wherein the plurality of spark gap circuits comprises a spark gap circuit for at least one of the conductive paths of each of the plurality of differential pairs of conductive paths.

4. The communications patching device of claim 2, wherein the plurality of spark gap circuits comprises a spark gap circuit for each of the plurality of conductive paths.

5. The communications patching device of claim 2, further comprising a conductive element extending from the wiring board that electrically connects the conductive traces of each of the spark gap circuits to ground.

6. The communications patching device of claim 5, wherein the conductive element comprises a pin that is received within a metal-plated hole in the wiring board, wherein the pin is configured to directly contact a metal portion of the mounting frame, and wherein the mounting frame is connected to ground.

7. The communications patching device of claim 1, further comprising a plurality of additional jacks that are mounted to the mounting frame, wherein each of the additional jack has a plurality of input terminals, a plurality of output terminals, a wiring board that includes a plurality of conductive paths that each electrically connect a respective one of the input terminals to a respective one of the output terminals, and a plurality of spark gap circuits on the wiring board, wherein each spark gap circuit provides an electronic static discharge path for a respective one of the plurality of conductive paths.

8. The communications patching device of claim 1, wherein the wiring board includes conductive paths that connect input terminals of a plurality of additional jacks to output terminals of the plurality of additional jacks, and wherein the wiring board includes a plurality of additional spark gap circuits that each provide an electronic static discharge path for a respective one of the plurality of additional conductive paths.

9. The communications patching device of claim 2, wherein the patching device comprises a power-over-Ethernet enabled patch panel.

* * * * *